United States Patent
Ledieu

(10) Patent No.: US 12,068,650 B2
(45) Date of Patent: Aug. 20, 2024

(54) STATOR FOR AN ELECTRIC MOTOR

(71) Applicant: NOVARES FRANCE, Clamart (FR)

(72) Inventor: Cédric Ledieu, Mont Saint Eloi (FR)

(73) Assignee: NOVARES FRANCE, Clamart (FR)

( * ) Notice: Subject to any disclaimer, the term of this patent is extended or adjusted under 35 U.S.C. 154(b) by 241 days.

(21) Appl. No.: 17/787,750

(22) PCT Filed: Dec. 2, 2020

(86) PCT No.: PCT/FR2020/052244
§ 371 (c)(1),
(2) Date: Jun. 21, 2022

(87) PCT Pub. No.: WO2021/123536
PCT Pub. Date: Jun. 24, 2021

(65) Prior Publication Data
US 2023/0072181 A1    Mar. 9, 2023

(30) Foreign Application Priority Data

Dec. 18, 2019 (FR) ..................... 1914705

(51) Int. Cl.
*H02K 3/24* (2006.01)
*H02K 1/16* (2006.01)
(Continued)

(52) U.S. Cl.
CPC ................. *H02K 3/24* (2013.01); *H02K 1/16* (2013.01); *H02K 3/14* (2013.01); *H02K 3/22* (2013.01);
(Continued)

(58) Field of Classification Search
CPC ............ H02K 5/203; H02K 1/16; H02K 3/14; H02K 3/22; H02K 3/24; H02K 3/50; H02K 2203/09
See application file for complete search history.

(56) References Cited

U.S. PATENT DOCUMENTS

2006/0250114 A1* 11/2006 Faberman ................ H02P 9/48
322/24
2010/0019589 A1* 1/2010 Saban .................. H02K 5/1285
310/216.069
(Continued)

FOREIGN PATENT DOCUMENTS

CN    117256090 A  * 12/2023 ............. H02K 15/02
DE    1282159 B    11/1968
(Continued)

OTHER PUBLICATIONS

International Search Report issued Jan. 28, 2021 re: Application No. PCT/FR2020/052244, pp. 1-3, citing: DE 29702117 U1, WO 2018167294 A1, DE 1282159 B and U.S. Pat. No. 20140139057 A1.

*Primary Examiner* — Mohamad A Musleh
(74) *Attorney, Agent, or Firm* — CANTOR COLBURN LLP

(57) ABSTRACT

A stator for an electric motor includes a stator body forming a ring, the inner face of which is provided with teeth delimiting two by two notches open towards the inside of the stator body; U-shaped conductor segments, partially inserted into the notches of the stator body; and an electrical connection component to electrically connect the conductor segments together. The stator further includes a case for circulating a cooling fluid having a first fluid circulation channel, called the inlet channel, and a second fluid circulation channel, the outlet channel, the inlet and outlet channels being fluidly connected by connecting channels. Each connecting channel is formed by a cavity through each conductor segment along its entire length, the central cavity extending from an inlet end to an outlet end, the inlet end opening into the inlet channel and the outlet end opening into the output channel.

13 Claims, 6 Drawing Sheets

(51) Int. Cl.
*H02K 3/14* (2006.01)
*H02K 3/22* (2006.01)
*H02K 3/50* (2006.01)
*H02K 5/20* (2006.01)

(52) U.S. Cl.
CPC ............... *H02K 3/50* (2013.01); *H02K 5/203* (2021.01); *H02K 2203/09* (2013.01)

(56) References Cited

U.S. PATENT DOCUMENTS

| | | | |
|---|---|---|---|
| 2011/0025147 A1* | 2/2011 | Owng | H02K 5/207 310/63 |
| 2013/0147289 A1* | 6/2013 | Burger | H02K 15/00 29/596 |
| 2014/0139057 A1 | 5/2014 | Ho et al. | |

FOREIGN PATENT DOCUMENTS

| | | |
|---|---|---|
| DE | 29702117 U1 | 6/1998 |
| DE | 102021208851 A1 * | 2/2023 |
| WO | 2018167294 A1 | 9/2018 |

* cited by examiner

STATOR FOR AN ELECTRIC MOTOR

TECHNICAL FIELD

The disclosure relates to a stator for an electric motor arranged to allow a better removal of the heat generated during its operation. The disclosure also concerns an electric motor comprising such a stator.

BACKGROUND

In general, current electric motors include a rotor secured to a shaft and a stator which surrounds the rotor. The stator is mounted in a casing which includes bearings for the rotational mounting of the shaft. The rotor includes a body formed by a sheet metal stacking or claw pole held in the form of a package by means of a suitable fastening system. The body of the rotor includes inner cavities housing permanent magnets. The stator includes a body comprising a metal sheet stacking forming a ring, the internal face of which is provided with teeth delimiting two by two a plurality of notches open towards the inside of the stator body and intended to receive phase windings. These phase windings pass through the notches of the stator body and form coils projecting on either side of the stator body. The phase windings may for example comprise a plurality of U-shaped conductor segments, the free ends of two adjacent segments being connected together by welding.

During the operation of the motor, the current passing through the phase windings of the stator generates a significant heat that must be removed. In order to cool the stator, there are currently several solutions. One of these solutions includes circulating oil through the shaft of the rotor and then circulating this oil along the stator body such that it is in contact with the coils of the phase windings. Such a solution nevertheless requires providing numerous modifications to the structure of the motor, which makes it difficult to implement, and therefore relatively expensive. Another existing solution includes providing a cooling circuit inside the bearing with which the stator is shrunk, a cooling liquid circulating inside the cooling circuit making it possible to remove the heat generated by the stator via the bearing. Nonetheless, this solution has the disadvantage of being inefficient because the cooling liquid is not directly in contact with the phase windings of the stator.

SUMMARY

The disclosure therefore aims at providing a stator for an electric motor arranged to allow a better removal of the heat generated during its operation and not having the drawbacks of the existing solutions that are previously described.

To this end, the disclosure concerns a stator for an electric motor comprising:
- a stator body forming a ring, the internal face of which is provided with teeth delimiting two by two a plurality of notches open towards the inside of the stator body;
- a plurality of U-shaped conductor segments, more commonly called U-pin or Hair pin, each conductor segment comprising a pair of straight portions, respectively a first straight portion and a second straight portion, inserted inside the notches of the stator body, said straight portions extending parallel to an axial direction defined by the stator body and being connected to one of their ends by a connecting portion, said connecting portion having a twisted profile, such that the first straight portion of each of the conductor segments is at least partially inserted into one of the notches of the stator body by being adjacent to the inner diameter of the stator body and the second straight portion of each of the conductor segments is at least partially inserted into another of the notches of the stator body by being adjacent to the outer diameter of the stator body;
- electrical connection means for electrically connecting the conductor segments together;
- the stator further comprising a case for circulating a cooling fluid, said case comprising a first fluid circulation channel, called inlet channel, and a second fluid circulation channel, called outlet channel, said inlet and outlet channels being fluidly connected by a plurality of connecting channels, each connecting channel being formed by a central cavity passing through each conductor segment over its entire length, said central cavity extending from an inlet end to an outlet end, the inlet end opening into said inlet channel and the outlet end opening into said outlet channel.

Configured in this manner, the disclosure makes it possible to cool the stator more effectively due to the direct contact of the cooling fluid with the heat-generating elements. Moreover, due to the circulation of the cooling fluid inside the conductor segments and their homogeneous distribution inside the stator body, a better removal of the heat generated by the stator may be obtained. Furthermore, the stator arrangement provided by the disclosure is relatively simple and compact, which has an advantage in terms of production cost and ease of implementation.

The stator of the disclosure may also include one or more of the following features:
- the case for circulating the cooling fluid has an annular shape, the inlet, respectively outlet, channel also having an annular shape and being defined at least partially by an inner cavity of said circulation case.
- the inlet channel is adjacent to an inner peripheral edge of the cooling fluid circulation case and the outlet channel is adjacent to an outer peripheral edge of said circulation case.
- the inlet channel is adjacent to an outer peripheral edge of the cooling fluid circulation case and the outlet channel is adjacent to an inner peripheral edge of said circulation case.
- the electrical connection means are formed of a plurality of electrical connectors in the shape of 8, each electrical connector being made of an electrically conductive material and comprising a first section surrounding a first free end of one of the conductor segments and a second section surrounding a second free end of another conductor segment, the first and second free ends being disposed adjacent to each other in a radial direction defined by the stator body.
- the electrically conductive material is copper or aluminum.
- the electrical connection means are housed inside the cooling fluid circulation case.
- sealing means are disposed inside the cooling fluid circulation case so as to avoid any passage of fluid between the inlet and outlet channels and the outside of said circulation case.
- the sealing means are formed of a plurality of annular-shaped gaskets, each gasket being disposed between an inner wall of the cooling fluid circulation case and a free end of one of the conductor segments.
- each of the straight portions of each of the conductor segments is prolonged by an end portion having a first portion contiguous to the straight portion and disposed obliquely with respect to the axial direction defined by the stator body, and a second portion contiguous to the first portion and disposed parallel to said axial direction.

each conductor segment has a rectangular, circular or oval cross-section.

the cooling fluid circulation case is provided, on at least one of its outer walls, with a fluid inlet pipe in fluid communication with the inlet channel and with a fluid outlet pipe in fluid communication with the outlet channel.

The disclosure also concerns an electric motor comprising such a stator.

BRIEF DESCRIPTION OF THE DRAWINGS

Other features and advantages will appear clearly from the description hereinafter of a particular embodiment of the disclosure, as a non-limiting example, with reference to the appended drawings in which.

DETAILED DESCRIPTION OF THE DRAWINGS

Figure 1:
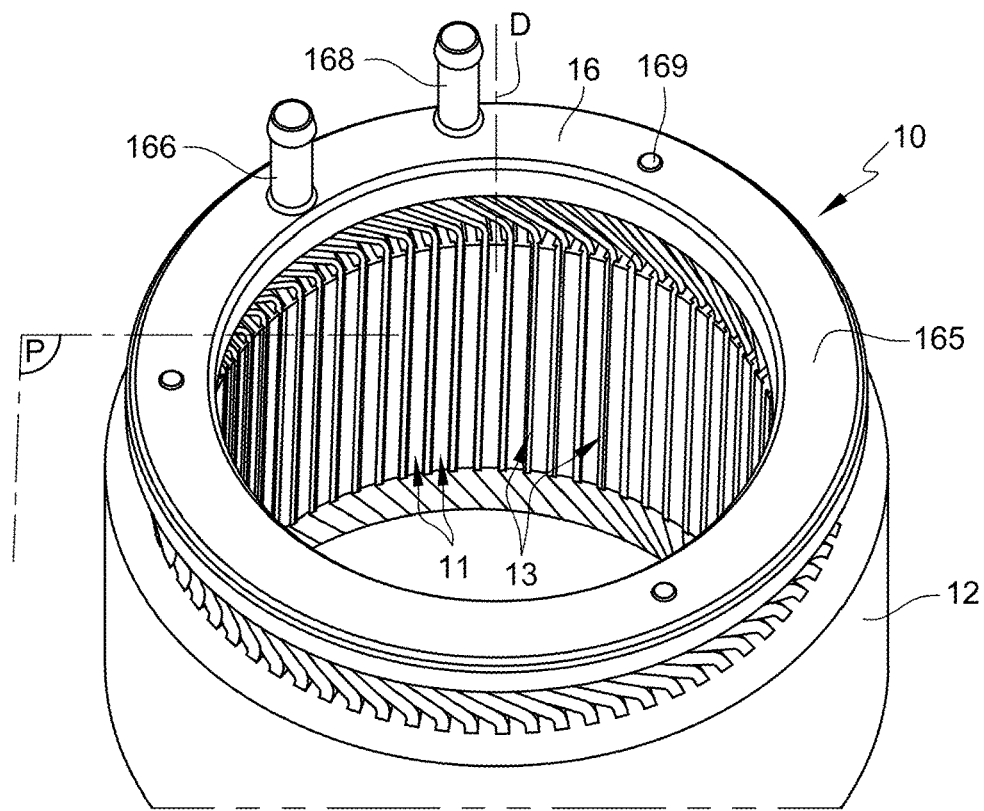
FIG. 1 is a perspective view of a stator according to the disclosure.
Figure 2:
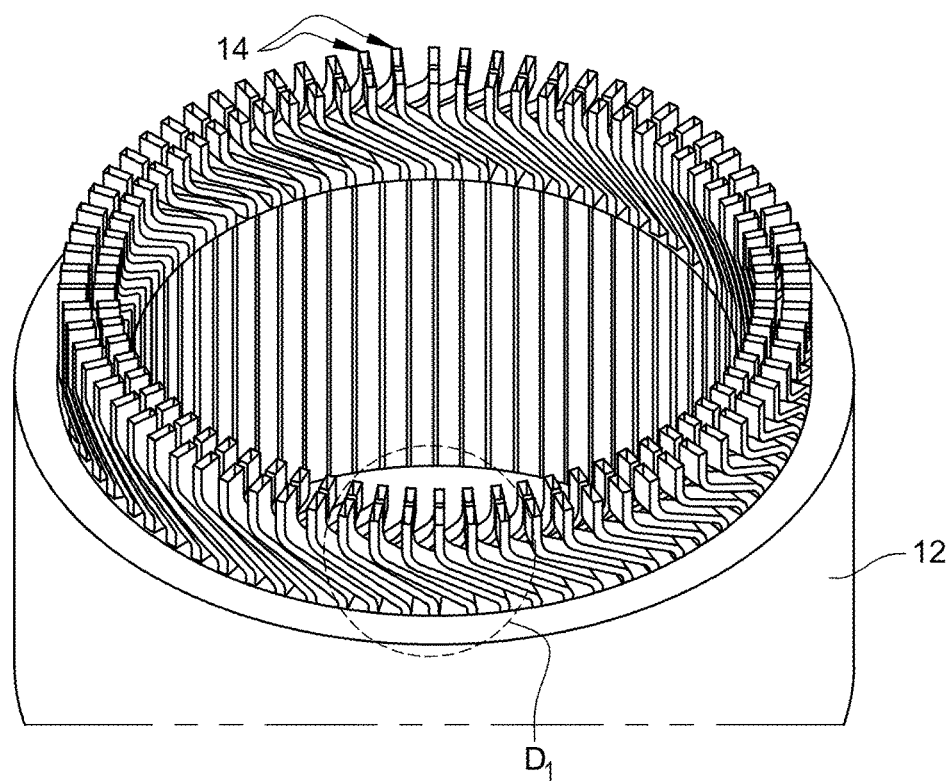
FIG. 2 is a perspective view of the stator of FIG. 1, in which the cooling fluid circulation case has been removed.
Figure 3:
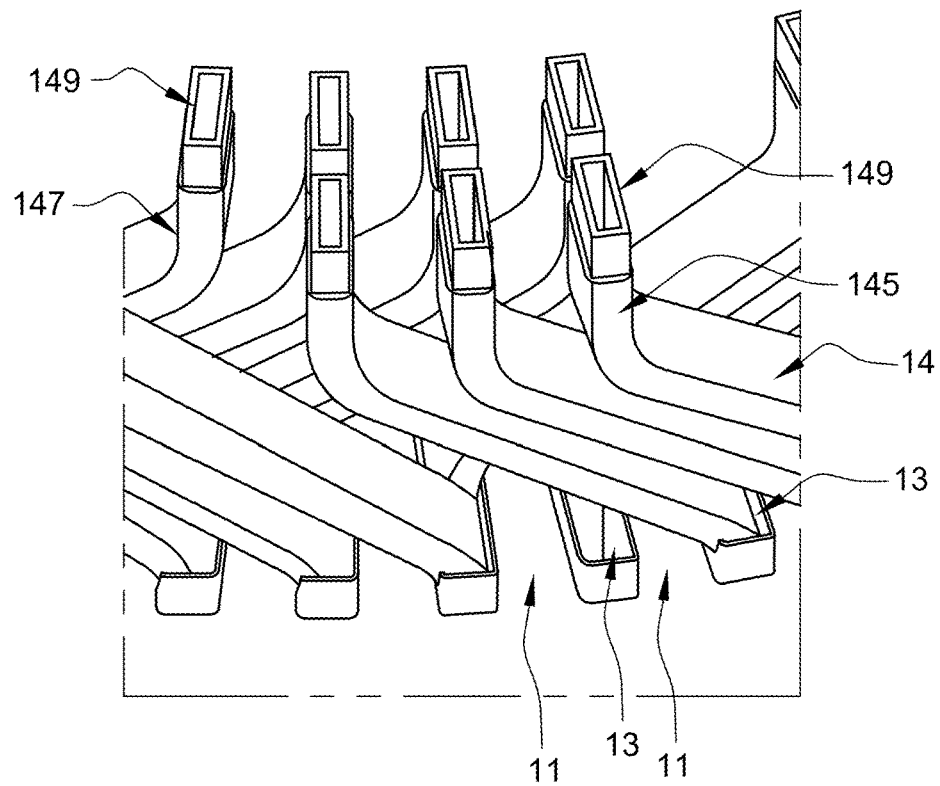
FIG. 3 is an enlarged view of detail D1 of FIG. 2.

Referring to FIGS. 1 and 2, there is represented a stator 10 according to the disclosure. This stator 10 comprises a body 12 in the form of a ring formed by a stack of metal sheets held in the form of a package by means of a suitable fastening system. The internal face of the stator body 12 is provided with teeth 11 extending parallel to an axial direction D and regularly spaced around the circumference of the body 12. The teeth 11 delimit two by two a plurality of notches 13 intended to house at least partially a plurality of U-shaped conductor segments 14. Thus, two successive notches 13 are separated by a tooth 11 as represented in FIG. 3. The notches 13 open axially onto the axial end faces of the stator body 12 and radially onto the internal face of the body 12. The free ends of each of the conductor segments 14 are housed inside a case 16 of annular shape, said case 16 being arranged to allow the circulation of a cooling fluid as explained in detail in the following paragraphs. For this purpose, the upper face 165 of the case 16 is provided with a first pipe 166 and a second pipe 168 extending axially from said upper face 165 and intended to respectively receive a fluid inlet flow and a fluid outlet flow. The first pipe 166 is adjacent to the inner diameter of the case 16 and the second pipe 168 is adjacent to the outer diameter of the case 16.

Figure 4:
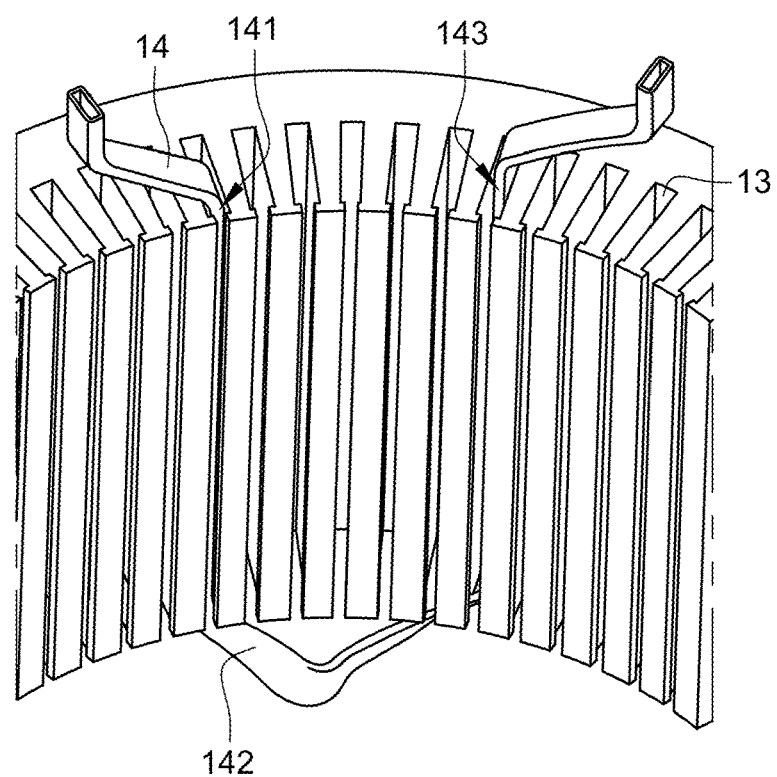
FIG. 4 is a partial view of the body of the stator of FIG. 1, in which a conductor segment has been disposed.

Referring to FIG. 4, there is represented one of the conductor segments 14 in its position that is mounted in the stator body 12. The other conductor segments 14 are not represented in this figure for the sake of clarity but, as represented in FIG. 2, they have substantially the same structure and shape as the segment represented in FIG. 4 and are disposed with respect to the latter so as to be offset along the circumference of the stator body by one or several notch(es) 13. In particular, the conductor segments 14 may advantageously have a rectangular cross-section so as to optimize their distribution inside the stator body 12.

Figure 5:
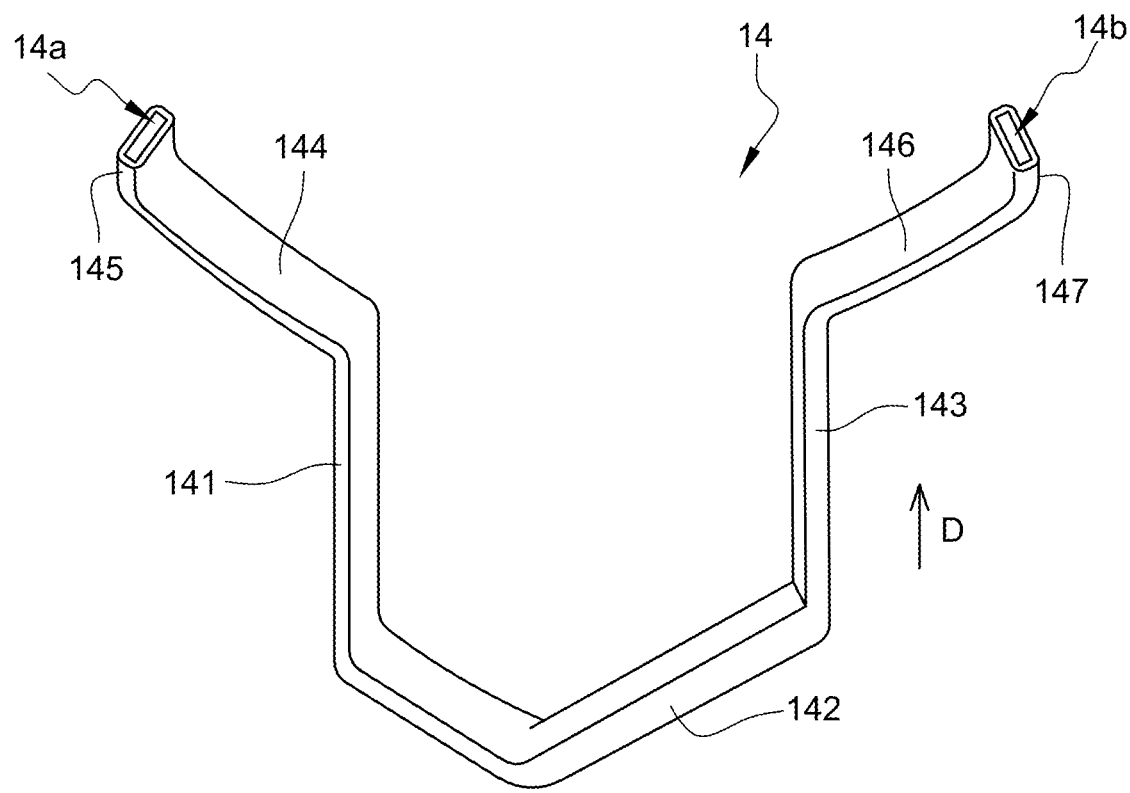
FIG. 5 is a perspective view of the conductor segment illustrated in FIG. 4.

The various component portions of each conductor segment 14 are illustrated in detail in FIG. 5. In particular, each conductor segment 14 comprises a pair of straight portions extending parallel to the axial direction D, respectively a first straight portion 141 and a second straight portion 143, and a connecting portion 142 having a twisted profile connecting the first straight portion 141 to the second straight portion 143. Each of the straight portions 141, 143 is prolonged by an end portion having a first portion 144, 146 contiguous to the straight portion 141, 143 and disposed obliquely with respect to the axial direction D, and a second portion 145, 147 contiguous to the first portion 144, 146 and disposed parallel to said axial direction D. Each conductor segment 14 contains a copper core covered with an enamel layer over its entire length except for an end portion 149 where the copper is exposed, as represented in FIG. 3.

Figure 6:
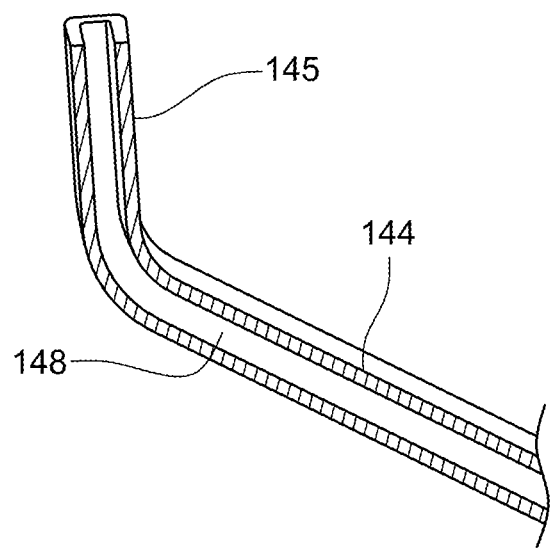
FIG. 6 is a partial cross-sectional view of the conductor segment represented in FIG. 5.

Moreover, each conductor segment 14 is provided with a central cavity 148 extending from an inlet end 14a to an outlet end 14b, as represented in FIG. 6. This central cavity 148 is configured to allow a fluid circulation from the inlet end 14a to the outlet end 14b.

Figure 10:
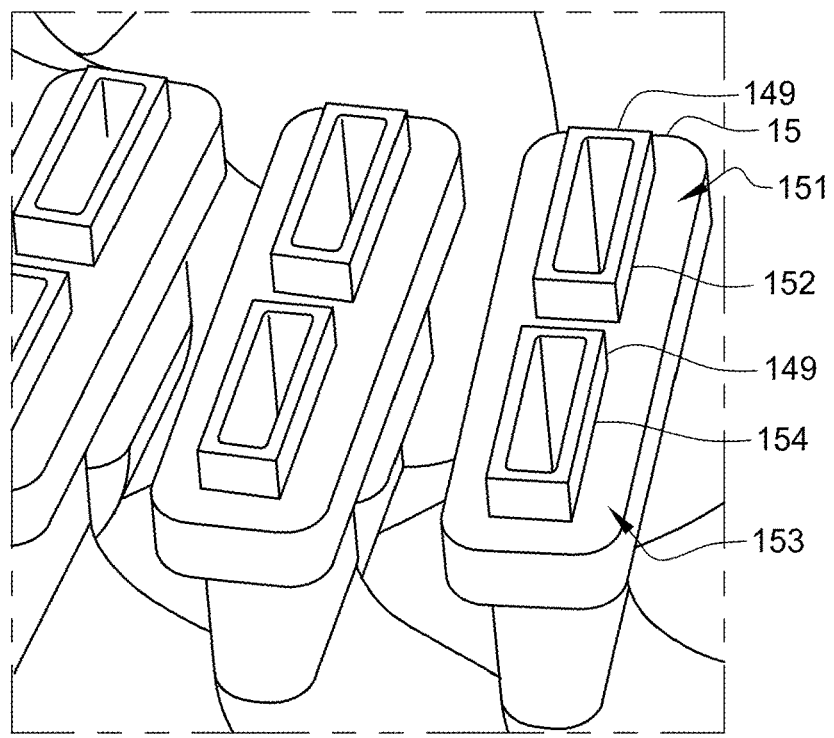
FIG. 10 is a view similar to FIG. 9, in which the gaskets are not represented.

As illustrated in FIG. 4, each conductor segment 14 is inserted inside the notches 13 of the stator body 12, such that the first straight portion 141 is received in one of the notches 13 while being adjacent to the inner diameter of the stator body 12 and the second straight portion 143 is housed in another notch 13 while being adjacent to the outer diameter of the stator body 12. This arrangement which is offset in the radial direction and in the circumferential direction of the second straight portion 143 with respect to the first straight portion 141 results from the specific shape of the connecting portion 142. Thus, in the completely assembled configuration of the stator body 12, each notch 13 serves to house the first straight portion 141 of a first conductor segment 14 and the second straight portion 143 of a second conductor segment 14. The conductor segments 14 whose straight portions 141, 143 are disposed adjacently in each of the notches 13 are electrically connected together by means of an electrical connector 15 in the form of 8, as represented in FIG. 10. Each electrical connector 15 comprises in particular a first tubular section 151 surrounding a first free end 149 of one of the conductor segments 14 and a second tubular section 153 surrounding a second free end 149 of another conductor segment 14, the first and second free ends 149 being disposed adjacent in a radial direction defined by the stator body 12. Each tubular section 151, 153 is crossed by a central opening 152, 154 configured to match the outer shape of one of said free ends 149. This electrical connector 15 may for example be made of copper or another conductive material so as to allow electricity conduction between said ends 149. By arranging an electrical connector 15 around each of the ends 149 of all the conductor segments 14, it is thus possible to establish an electrical circuit through the assembly of the winding formed by the plurality of conductor segments 14.

Figure 7:
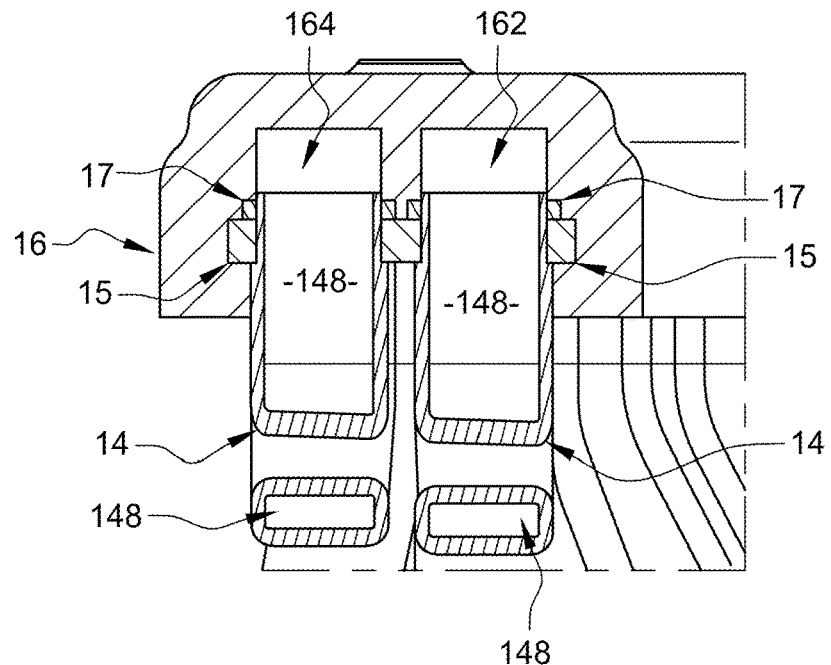
FIG. 7 is a cross-sectional view of the stator of the disclosure according to the section plane P of FIG. 1.
Figure 8:
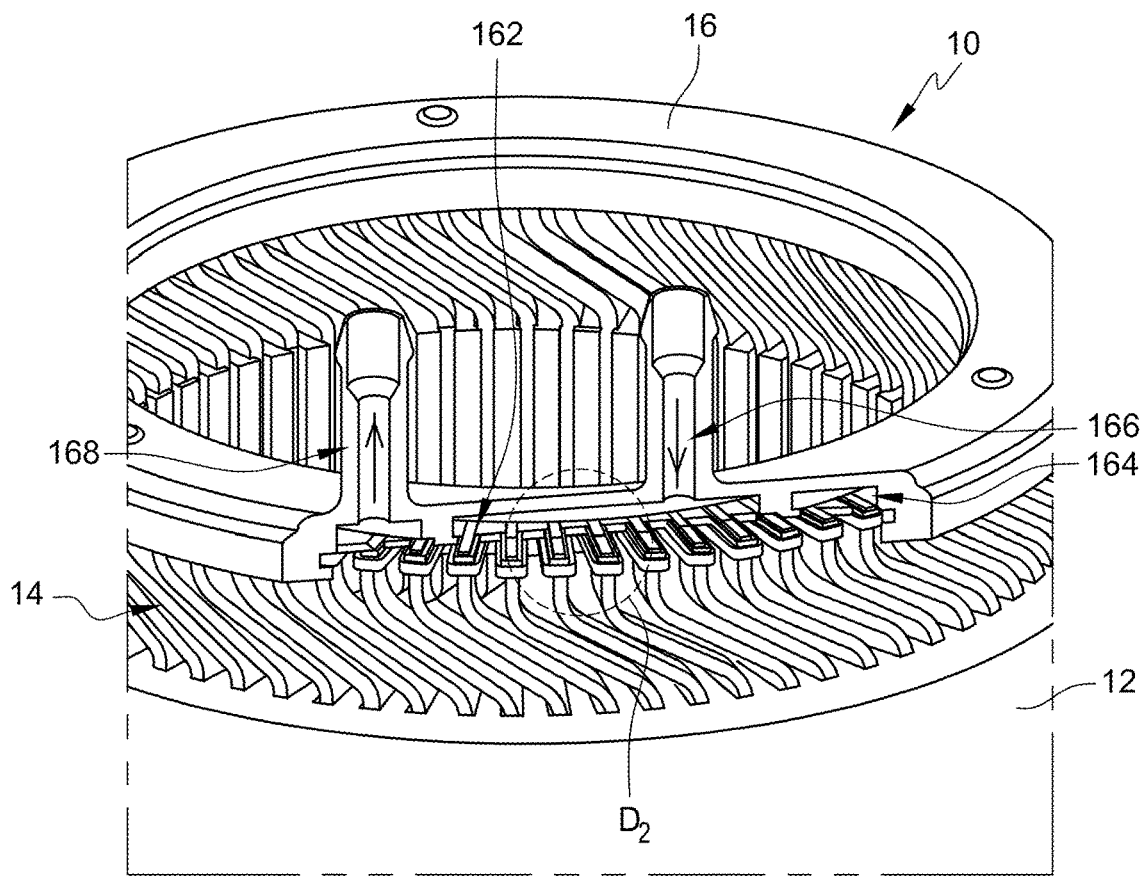
FIG. 8 is a perspective view of the upper rear portion of the stator of FIG. 1, with a cutaway at the cooling fluid circulation case.
Figure 9:
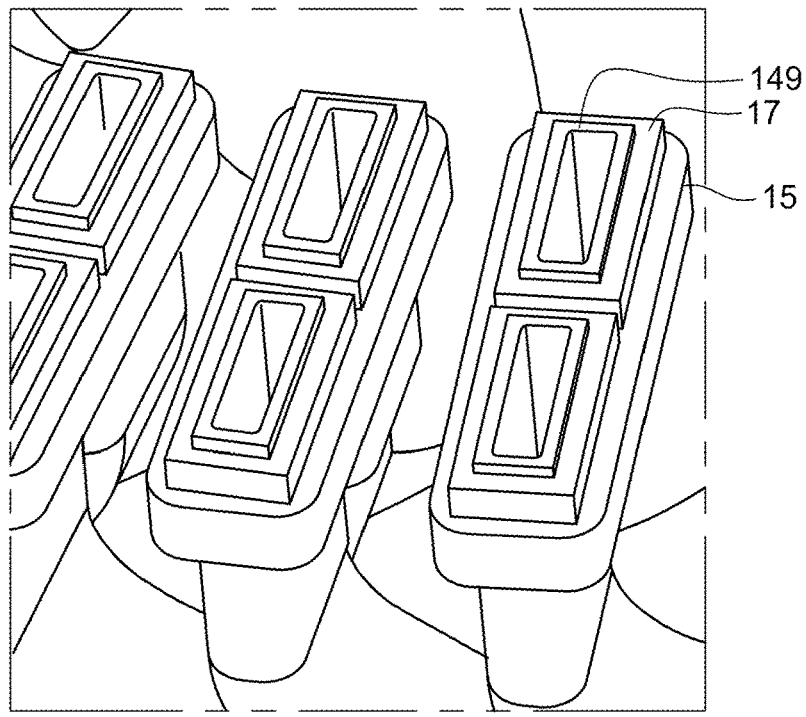
FIG. 9 is an enlarged view of detail D2 of FIG. 8.
Figure 11:
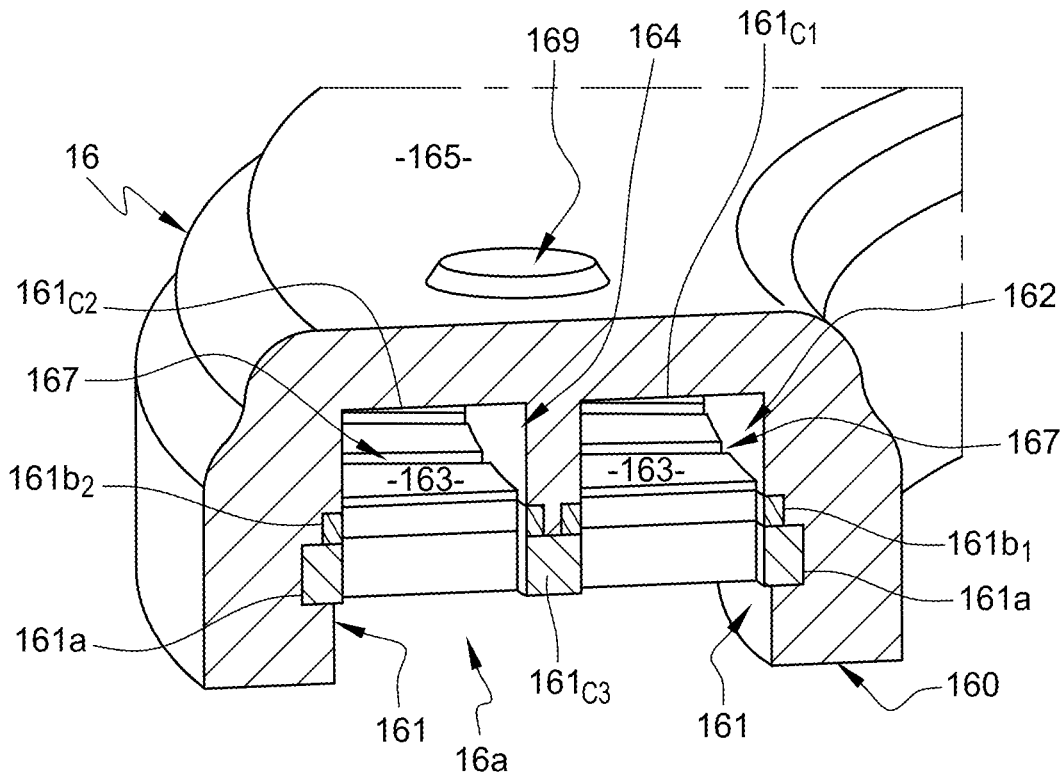
FIG. 11 is a cross-sectional view of the cooling fluid circulation case of the stator of FIG. 1.
Figure 12:
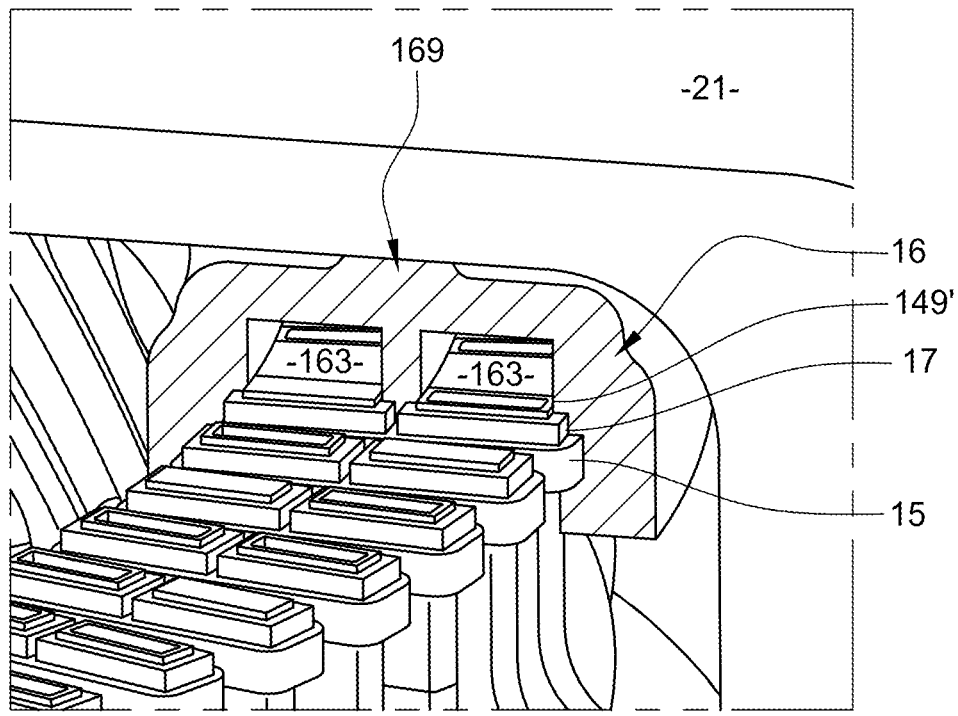
FIG. 12 is an enlarged view of the upper front portion of the stator of FIG. 1, with a cutaway at the cooling fluid circulation case, the stator being disposed inside a bearing of the electric motor.

As illustrated in FIGS. 7 and 8, the electrical connectors 15 may advantageously be housed inside the case 16. To this end, the case 16 comprises an inner cavity 16a, as represented in FIG. 11, opening onto a lower face 160 of the case 16. The cavity 16a is configured to define a series of first housings 161a disposed adjacently along the circumference of the case 16 and intended to house the electrical connectors 15. The cavity 16a also defines a series of second and third housings 161b1, 161b2 disposed axially adjacent to the first housings 161a, the housings 161b1 and 161b2 being radially adjacent to each other. Each housing 161b1, 161b2 is intended to house a gasket 17 of annular shape, each gasket 17 being disposed between an inner side wall 161 of the case 16 and a free end 149 of one of the conductor segments 14, as represented in FIGS. 9 and 12. In its upper portion, the cavity 16a is delimited by a first bottom wall 161c1 of annular shape and by a second bottom wall 161c2 of annular shape, said bottom walls 161c1, 161c2 being separated by a partition wall 161c3 of substantially annular shape, the first bottom wall 161c1 adjoining the inner side wall 161 which is adjacent to the inner diameter of the case 16 and the second bottom wall 161c2 adjoining the inner side wall 161 which is adjacent to the outer diameter of the case 16. The first bottom wall 161c1, respectively the second bottom wall 161c2, the inner side wall 161 and the partition wall 161c3 thus define a first annular portion 162, respectively a second annular portion 164, of the cavity 16a. The first annular portion 162, respectively the second annular portion 164, communicates with the second housing 161b1, respectively with the third housing 161b2, through radial slots 167 regularly spaced along the circumference of the case 16, each radial slot 167 being separated from an adjacent radial slot 167 by a partition wall 163. As represented in FIG. 12, each radial slot 167 is configured to house the upper portion 149' of a free end 149 of one of the conductor segments 14 which protrudes above the gasket 17. Configured in this manner, the inner cavity 16a makes it possible to create two fluid circulation channels, namely a first circulation channel, called inlet channel, defined by the first annular portion 162 and a second circulation channel, called outlet channel, defined by the second annular portion 164. The inlet and outlet channels 162, 164 are fluidly connected by a plurality of connecting channels, each connecting channel being defined by the central cavity 148 passing through each of the conductor segments 14 and which opens into the inlet channel 162 at the inlet end 14a and into the outlet channel 164 at the outlet end 14b.

As represented in FIG. 8, the case 16 will thus be able to receive a fluid flow through the inlet pipe 166. The inlet pipe 166 opening into the inlet channel 162, the fluid will first circulate along the inlet channel 162, then through the connecting channels 148, and then along the outlet channel 164. In its path through the case 16 and the conductor segments 14, the fluid will therefore gradually receive the heat released by the conductor segments 14. Once hot, it may then be removed from the case 16 through the outlet pipe 168 which opens into the outlet channel 164.

In an advantageous embodiment of the disclosure, the cooling fluid circulating inside the stator 10 may be a dielectric fluid, of the oil or glycol type for example, having non-oxidizing characteristics with respect to the conductive material used to form the conductor segments 14.

As represented in FIGS. 1, 11 and 12, the upper wall 165 of the case 16 may advantageously include several protruding shapes 169 regularly spaced along the circumference of the case 16, said protruding shapes 169 being intended to abut against a bearing 21 of the electric motor when the stator is installed in the motor.

The invention claimed is:

1. A stator for an electric motor comprising:
 a stator body forming a ring, the internal face of which is provided with teeth delimiting two by two a plurality of notches open towards the inside of the stator body;
 a plurality of U-shaped conductor segments, each conductor segment of said plurality of U-shaped conductor segments comprising a pair of straight portions, respectively a first straight portion and a second straight portion, inserted inside the notches of the stator body, said first and second straight portions extending parallel to an axial direction defined by the stator body and being connected to one of their ends by a connecting portion, said connecting portion having a twisted profile, such that the first straight portion of each of the plurality of U-shaped conductor segments is at least partially inserted into one of the notches of the stator body by being adjacent to the inner diameter of the stator body and the second straight portion of each of the plurality of U-shaped conductor segments is at least partially inserted into another of the notches of the stator body by being adjacent to the outer diameter of the stator body;
 electrical connection means allowing to electrically connect the conductor segments together;
 wherein the stator further comprises a case for circulating a cooling fluid, said case comprising an inlet channel, and an outlet channel, said inlet and outlet channels being fluidly connected by a plurality of connecting channels, each connecting channel being formed by a central cavity passing through each conductor segment over its entire length, said central cavity extending from an inlet end to an outlet end, the inlet end opening into said inlet channel and the outlet end opening into said outlet channel.

2. The stator according to claim 1, wherein the case for circulating the cooling fluid has an annular shape, the inlet, respectively outlet, channel, also having an annular shape and being defined at least partially by an inner cavity of said circulation case.

3. The stator according to claim 2, wherein the inlet channel is adjacent to an inner peripheral edge of the case for circulating the cooling fluid and the outlet channel is adjacent to an outer peripheral edge of said circulation case.

4. The stator according to claim 2, wherein the inlet channel is adjacent to an outer peripheral edge of the case for circulating the cooling fluid and the outlet channel is adjacent to an inner peripheral edge of said circulation case.

5. The stator according to claim 1, wherein the electrical connection means are formed of a plurality of electrical connectors in the form of 8, each electrical connector comprising an electrically conductive material and comprising a first section surrounding a first free end of one of the conductor segments and a second section surrounding a second free end of another conductor segment (14), the first and second free ends being disposed adjacently in a radial direction defined by the stator body.

6. The stator according to claim 5, wherein the electrically conductive material is copper or aluminum.

7. The stator according to claim 1, wherein the electrical connection means are housed inside the cooling fluid circulation case.

8. The stator according to claim 1, whereby sealing means are disposed inside the cooling fluid circulation case to avoid any passage of fluid between the inlet and outlet channels and the outside of said circulation case.

9. The stator according to claim 8, wherein the sealing means are formed of a plurality of gaskets of annular shape, each gasket being disposed between an inner wall of the cooling fluid circulation case and a free end of one of the conductor segments.

10. The stator according to claim 1, wherein each of the straight portions of each of the conductor segments is prolonged by an end portion having a first portion contiguous to the straight portion and disposed obliquely with respect to the axial direction defined by the body of the stator, and a second portion contiguous to the first portion and disposed parallel to said axial direction.

11. The stator according to claim 1, wherein each conductor segment has a cross-section of rectangular shape, circular shape, or oval shape.

12. The stator according to claim 1, wherein the cooling fluid circulation case is provided, on at least one of its outer walls, with a fluid inlet pipe in fluid communication with the inlet channel and a fluid outlet pipe in fluid communication with the outlet channel.

13. An electric motor comprising the stator according to claim 1.

* * * * *